(12) United States Patent
Morishita et al.

(10) Patent No.: US 12,505,315 B2
(45) Date of Patent: Dec. 23, 2025

(54) INFORMATION LEARNING APPARATUS, INFORMATION PROCESSING APPARATUS, INFORMATION LEARNING METHOD, INFORMATION PROCESSING METHOD AND PROGRAM

(71) Applicant: NTT, Inc., Tokyo (JP)

(72) Inventors: Makoto Morishita, Tokyo (JP); Jun Suzuki, Tokyo (JP); Masaaki Nagata, Tokyo (JP)

(73) Assignee: NTT, Inc., Tokyo (JP)

( * ) Notice: Subject to any disclaimer, the term of this patent is extended or adjusted under 35 U.S.C. 154(b) by 866 days.

(21) Appl. No.: 17/618,372

(22) PCT Filed: Jun. 14, 2019

(86) PCT No.: PCT/JP2019/023746
§ 371 (c)(1),
(2) Date: Dec. 10, 2021

(87) PCT Pub. No.: WO2020/250443
PCT Pub. Date: Dec. 17, 2020

(65) Prior Publication Data
US 2022/0366155 A1 Nov. 17, 2022

(51) Int. Cl.
*G06F 40/58* (2020.01)
*G06N 3/08* (2023.01)
(52) U.S. Cl.
CPC ............... *G06F 40/58* (2020.01); *G06N 3/08* (2013.01)

(58) Field of Classification Search
CPC .......... G06F 40/58; G06F 40/44; G06N 3/08; G06N 3/044; G06N 3/0455; G06N 3/096
See application file for complete search history.

(56) References Cited

PUBLICATIONS

Bojar, Ondřej, et al. "UFAL submissions to the IWSLT 2016 MT track." Proceedings of the 13th International Conference on Spoken Language Translation. 2016. (Year: 2016).*
Morishita et al., "Neural Machine Translation Integrating Interactive Reproductive Learning", In Proceedings of the 25th Annual Meeting of the Association for Natural Language Processing (NLP019), pp. 1387 to 1390, 2019.
Tu et al., "Neural Machine Translation With Reconstruction", In Proceedings of AAAI, pp. 1 to 7, 2016.
Lample et al., "Unsupervised Machine Translation Using Monolingual Corpora Only", In Proceedings of ICLR, pp. 1 to 14, 2018.
Tu et al., "Modeling Coverage for Neural Machine Translation", In Proceedings of ACL, pp. 76 to 85, 2016.

(Continued)

*Primary Examiner* — Van C Mang (57) ABSTRACT

An information learning apparatus includes a memory and a processor configured to perform encoding first data in training data in which the first data related to a first series and second data which is correct data for the first data in a second series are associated with each other; decoding data generated in the encoding to generate third data related to the second series; fourth data related to the first series for data generated in the decoding; and learning, based on an error between the second data and the third data and an error between the first data and the fourth data, parameters used by the encoding, the decoding, and the generating, wherein the generating and the encoding share parameters.

9 Claims, 11 Drawing Sheets

(56) References Cited

PUBLICATIONS

Tu et al., "Neural Machine Translation With Reconstruction", In Proceedings of AAAI, pp. 3097 to 3103, 2017.
Vaswani et al., "Attention Is All You Need", In Proceedings of NIPS, pp. 6000 to 6010, 2017.
Sennrich et al., "Neural Machine Translation of Rare Words with Subword Units", In Proceedings of ACL, pp. 1715 to 1725, 2016.
Xia et al., "Dual Learning for Machine Translation", In Proceedings of NIPS, pp. 820 to 828, 2016.
Xia et al., "Model-Level Dual Learning", In Proceedings of ICML, pp. 5383 to 5392, 2018.
Cettolo et al., "WIT3: Web Inventory of Transcribed and Translated Talks", In Proceedings of EAMT, pp. 261 to 268, 2012.
Gehring et al., "Convolutional Sequence to Sequence Learning", In Proceedings of ICML, pp. 1243 to 1252, 2017.
Press et al., "Using the Output Embedding to Improve Language Models", In Proceedings of EACL, pp. 157 to 163, 2017.
Papineni et al., "BLEU: A Method for Automatic Evaluation of Machine Translation", In Proceedings of ACL, pp. 311 to 318, 2002.
Koehn., "Statistical Significance Tests for Machine Translation Evaluation", In Proceedings of EMNLP, pp. 388 to 395, 2004.

\* cited by examiner

INFORMATION LEARNING APPARATUS, INFORMATION PROCESSING APPARATUS, INFORMATION LEARNING METHOD, INFORMATION PROCESSING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/023746, filed on 14 Jun. 2019, the disclosure of which is hereby incorporated herein by reference in its entirety.

TECHNICAL FIELD

The present invention relates to an information learning apparatus, an information processing apparatus an information learning method, an information processing method, and a program.

BACKGROUND ART

Although the translated text generated by neural machine translation (NMT) is fluent, it has been pointed out that there is a problem of lack of faithfulness, such as occasionally not translating a part of the original text (e.g., NPL 1). It is considered that this is because a mechanism for guaranteeing that all the information on the original language sentence has been translated, which is essentially provided in statistical translation (SMT), is difficult to handle in the NMT model.

In order to solve this problem, a reconstruction learning model (Reconstruction Model) has been proposed (NPL 2). In this model, a reconstructor that reconstructs the original language sentence based on a hidden layer of a decoder is introduced, and in addition to errors depending on normal target language sentences, errors due to the reconstruction of the original language (original sentence reconstruction errors) are also used to learn the model as multitask learning. As a result, the hidden layer of the decoder will contain all the information in the original text, and it is thus expected that the translated text will be more faithful to the original text.

CITATION LIST

Non Patent Literature

[NPL 1] Zhaopeng Tu, ZhengdongLu, Yang Liu, Xiaohua Liu, and Hang Li. Modeling coverage for neural machine translation. In Proceedings of ACL, pp. 76-85, 2016.
[NPL 2] Zhaopeng Tu, Yang Liu, Lifeng Shang, Xiaohua Liu, and Hang Li. Neural machine translation with reconstruction. In Proceedings of AAAI, pp. 3097-3103, 2017.

SUMMARY OF THE INVENTION

Technical Problem

However, since the reconstructor needs to be trained separately in addition to the typical NMT model, a drawback of the reconstruction learning model is that the total number of model parameters is larger than that of the typical NMT.

The present invention has been made in view of the foregoing, and an object of the present invention is to implement a reconstruction learning model while suppressing an increase in parameters.

Means for Solving the Problem

Therefore, in order to solve the above problem, an information learning apparatus includes: a first-series processing unit that encodes first data in training data in which the first data related to a first series and second data which is correct data for the first data in a second series are associated with each other; a second-series processing that decodes data generated in the encoding to generate third data related to the second series; a third-series processing unit that generates fourth data related to the first series for data generated in the decoding; and a learning unit that learns, based on an error between the second data and the third data and an error between the first data and the fourth data, parameters used by the first-series processing unit, the second-series processing unit, and the third-series processing unit, wherein the third-series processing unit and the first-series processing unit share parameters.

Effects of the Invention

It is possible to implement a reconstruction learning model while suppressing an increase in parameters.

BRIEF DESCRIPTION OF DRAWINGS

FIG. 12 is a flowchart for explaining an example of a processing procedure of learning processing performed by a translation device 10 according to the second embodiment.

DESCRIPTION OF EMBODIMENTS

Embodiments of the present invention will be described below with reference to the drawings. With respect to the neural machine translation (NMT) model, in recent years, for the purpose of shortening the learning time and improving the performance, an NMT model has been proposed using only an attention mechanism (Attention) and a feed-forward layer without using any recurrent neural network RNN ("Ashish Vaswani, Noam Shazeer, Niki Parmar, Jakob Uszkoreit, Llion Jones, Aidan N. Gomez, Lukasz Kaiser, and Illia Polosukhin. Attention is all you need. In Proceedings of NIPS, pp. 6000-6010, 2017."). This model is generally called a Transformer model, which is known as having more translation accuracy even by short-time learning than those in the existing RNN-based models. In the present embodiment, an example in which an NMT model is constructed using the Transformer model will be described. However, an RNN may be used.

Figure 1:
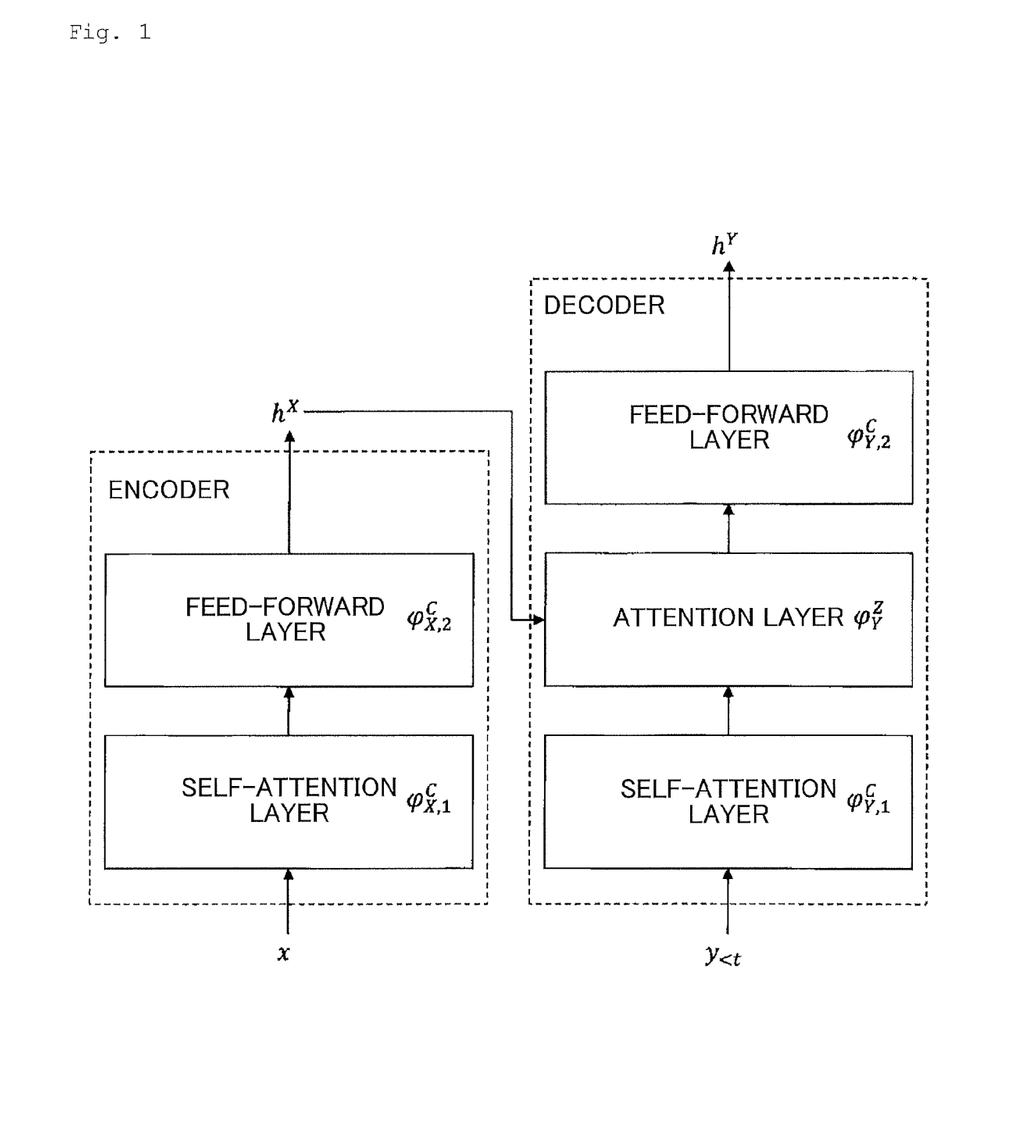
FIG. 1 is a diagram illustrating the outline of a Transformer model.

FIG. 1 is a diagram illustrating the outline of a Transformer model. The Transformer model is mainly composed of three layers, that is, (1) a self-attention layer $\varphi^C_{\cdot,1}(\cdot)$. (2) an attention layer $\varphi^Z(\cdot)$ to the encoder side, and (3) a feed-forward layer $\varphi^C_{\cdot,2}(\cdot)$, and is formulated as follows.

[Formula 1]

$$\tilde{x} = \varphi_{X,1}^C(x), h^X = \varphi_{X,2}^C(\tilde{x}) \quad (1)$$

$$\tilde{y}_{<t} = \varphi_{Y,1}^C(y_{<t}), h_t^Y = \varphi_{Y,2}^C(\tilde{y}_{<t} + \varphi_Y^Z(\tilde{y}_{<t}, h^X)) \quad (2)$$

Here, x represents an original language sentence, y represents a target language sentence, x with "~" thereon represents a series of vectors output from the self-attention layer of the encoder for x, and y with "~" thereon represents a series of vectors output from the self-attention layer of the decoder for y, and a symbol with a subscript of "<t" represents the value of the symbol before time t.

Figure 2:
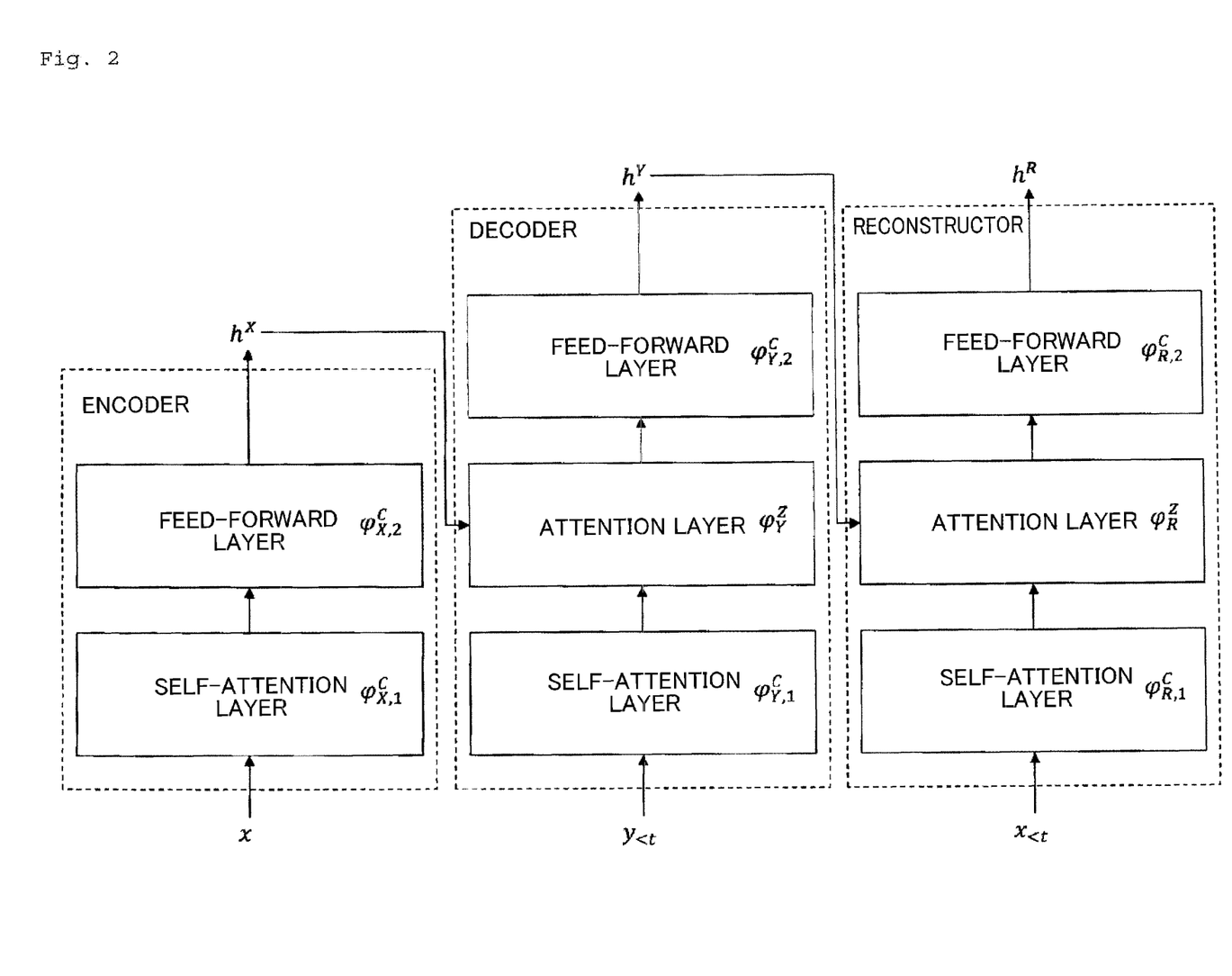
FIG. 2 is a diagram illustrating the outline of a Transformer model with a reconstructor added.

The result of simply adding a reconstructor for a reconstruction learning model to the Transformer model of FIG. 1 is, for example, as follows in FIG. 2. FIG. 2 is a diagram illustrating the outline of a Transformer model with a reconstructor added. In FIG. 2, the reconstructor is formulated as follows, similarly to the decoder.

[Formula 2]

$$\tilde{r}_{<t} = \varphi_{R,1}^C(x_{<t}), h_t^R = \varphi_{R,2}^C(\tilde{r}_{<t} + \varphi_R^Z(\tilde{r}_{<t}, h^Y)) \quad (3)$$

In this case, since it is necessary to train the regenerator separately in addition to the normal Transformer model, the total number of model parameters is larger than that of the normal Transformer model.

Accordingly, in a first embodiment, paying attention to the fact that the structures of the encoder and the reconstructor are similar, the encoder and the reconstructor are implemented to share their parameters. Here, sharing the parameters between the encoder and the reconstructor means the implementation of the reconstructor using the encoder. As a result, an original sentence reconstruction error due to the reconstructor can be used for learning while suppressing an increase in parameters due to the addition of the reconstructor.

Figure 3:
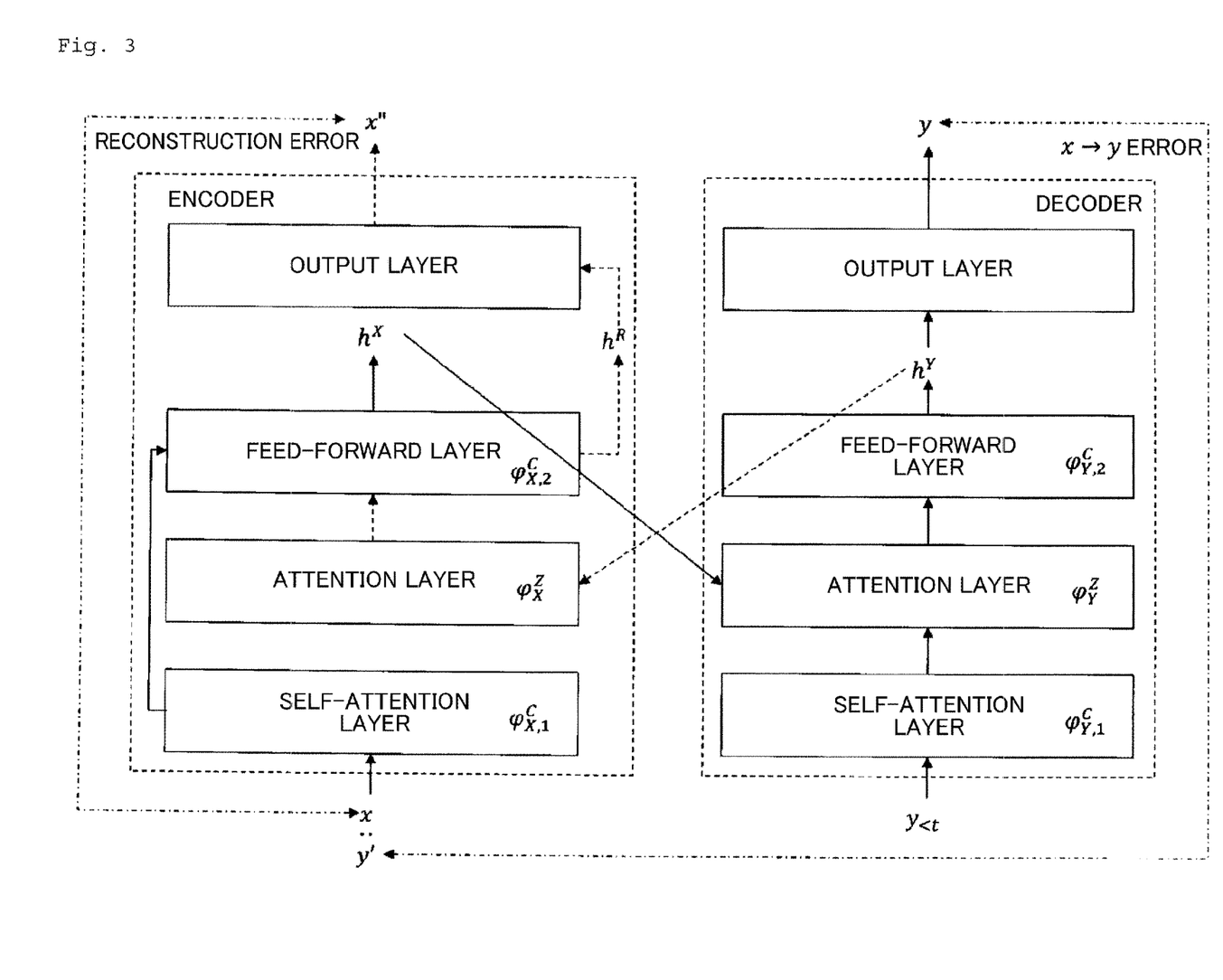
FIG. 3 is a diagram illustrating the outline of a model according to a first embodiment.

FIG. 3 is a diagram illustrating the outline of a model according to the first embodiment. In FIG. 3, each solid line arrow indicates a processing path for translation from an original language sentence x to a target language sentence y. Each dashed arrow indicates a processing path for a reconstructor. Note that in FIG. 3, y' represents the correct target language sentence associated with the original language sentence x in training data. Further, x" represents a reconstruction result of the original language sentence from the reconstructor.

As illustrated in FIG. 3, in the processing path for the reconstructor, $h^Y$ that is an output from a feed-forward layer of a decoder is input to an attention layer of an encoder. A calculation result from the attention layer is input to a feed-forward layer of the encoder, a calculation result $h^R$ from the feed-forward layer is input to an output layer of the encoder. The output layer outputs a reconstruction result x". An error between the original language sentence x and the x" corresponds to a reconstruction error.

Figure 4:
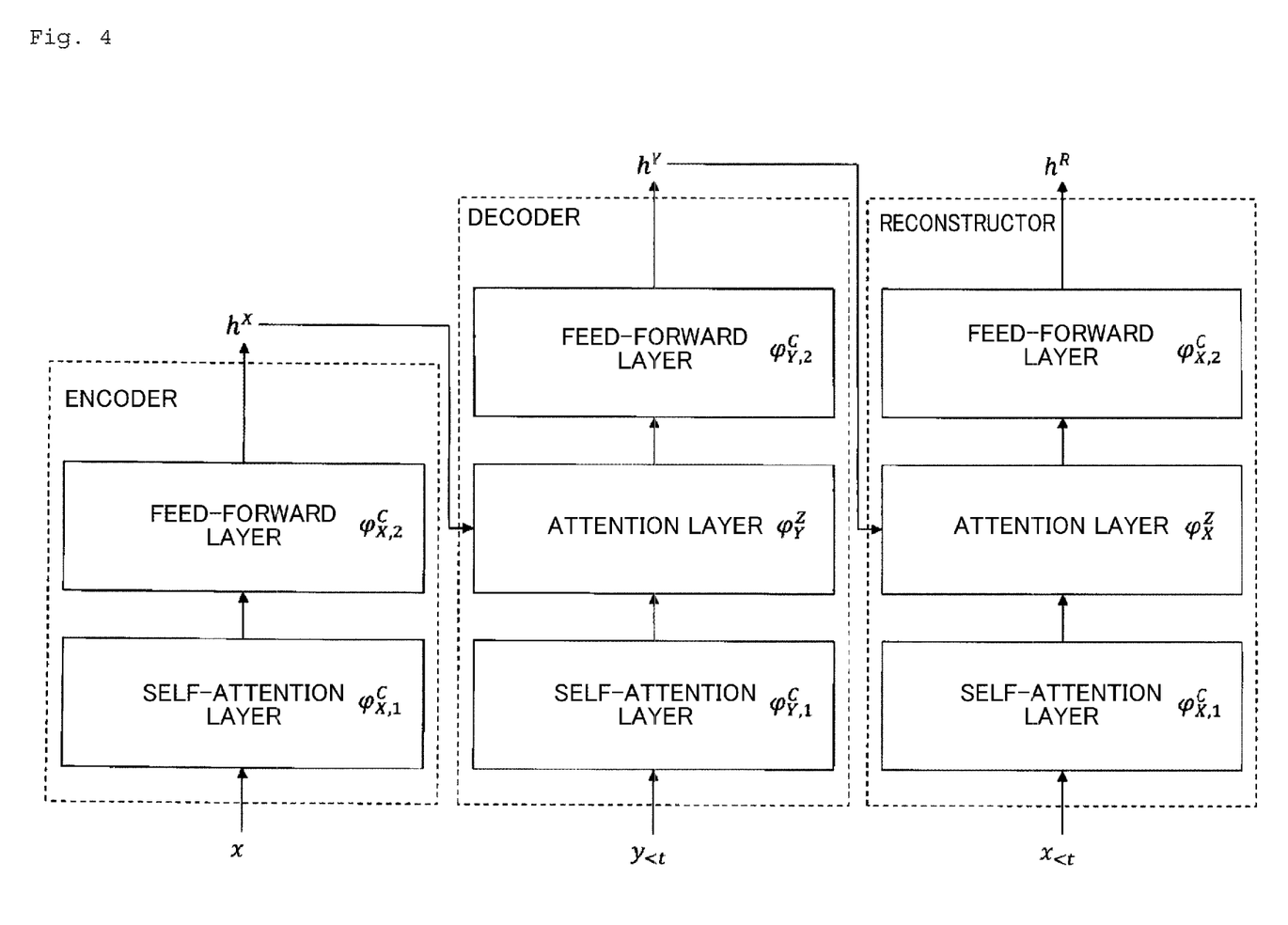
FIG. 4 is a diagram illustrating an example in which a reconstructor is expanded in the model according to the first embodiment.

For the sake of convenience, if expanding the virtually existing reconstructor in FIG. 3, it can be shown as in FIG. 4. FIG. 4 is a diagram illustrating an example in which the reconstructor is expanded in the model according to the first embodiment. In FIG. 4, for the sake of convenience, the output layers of the encoder, the decoder, and the reconstructor are omitted.

As described with reference to FIG. 3, since the substance of the reconstructor is the encoder, the parameters for a function (φ) representing each of the layers constituting the reconstructor are the same as those of each layer of the encoder. Note that since the attention layer does not work (is disabled) in the encoder, the attention layer in the encoder is omitted in FIG. 4.

As is clear from comparison of FIG. 4 and FIG. 2, the model according to the first embodiment is the same as the Transform model with respect to the translation from x to y. Accordingly, Equations (1) and (2) are applicable for that translation.

On the other hand, the function (symbol) representing each layer of the reconstructor are different between FIG. 4 and FIG. 2. Therefore, the reconstructor of the present embodiment is formulated as the following Equation (4).

[Formula 3]

$$r_{<t} = \varphi_{X,1}^C(x_{<t}), h_t^R = \varphi_{X,2}^C(r_{<t} + \varphi_X^Z(r_{<t}, h^Y)) \quad (4)$$

In addition, a new objective function resulting from the introduction of the reconstructor is represented by the following equation.

[Formula 4]

$$\mathcal{L}(\theta) = \underset{\theta}{\operatorname{argmax}} \sum_{n=1}^{N} \{\log P(y^{(n)} \mid x^{(n)}; \theta) + \log P(x^{(n)} \mid h^{Y(n)}; \theta)\} \quad (5)$$

Here, a bilingual corpus used for learning has N sentences as a whole, and $x^{(n)}$ and $y^{(n)}$ represent the n-th original language sentence and the n-th target language sentence, respectively. Further, $h^{Y(n)}$ represents a hidden layer of the decoder for $x^{(n)}$-to-$y^{(n)}$ translation.

Figure 5:
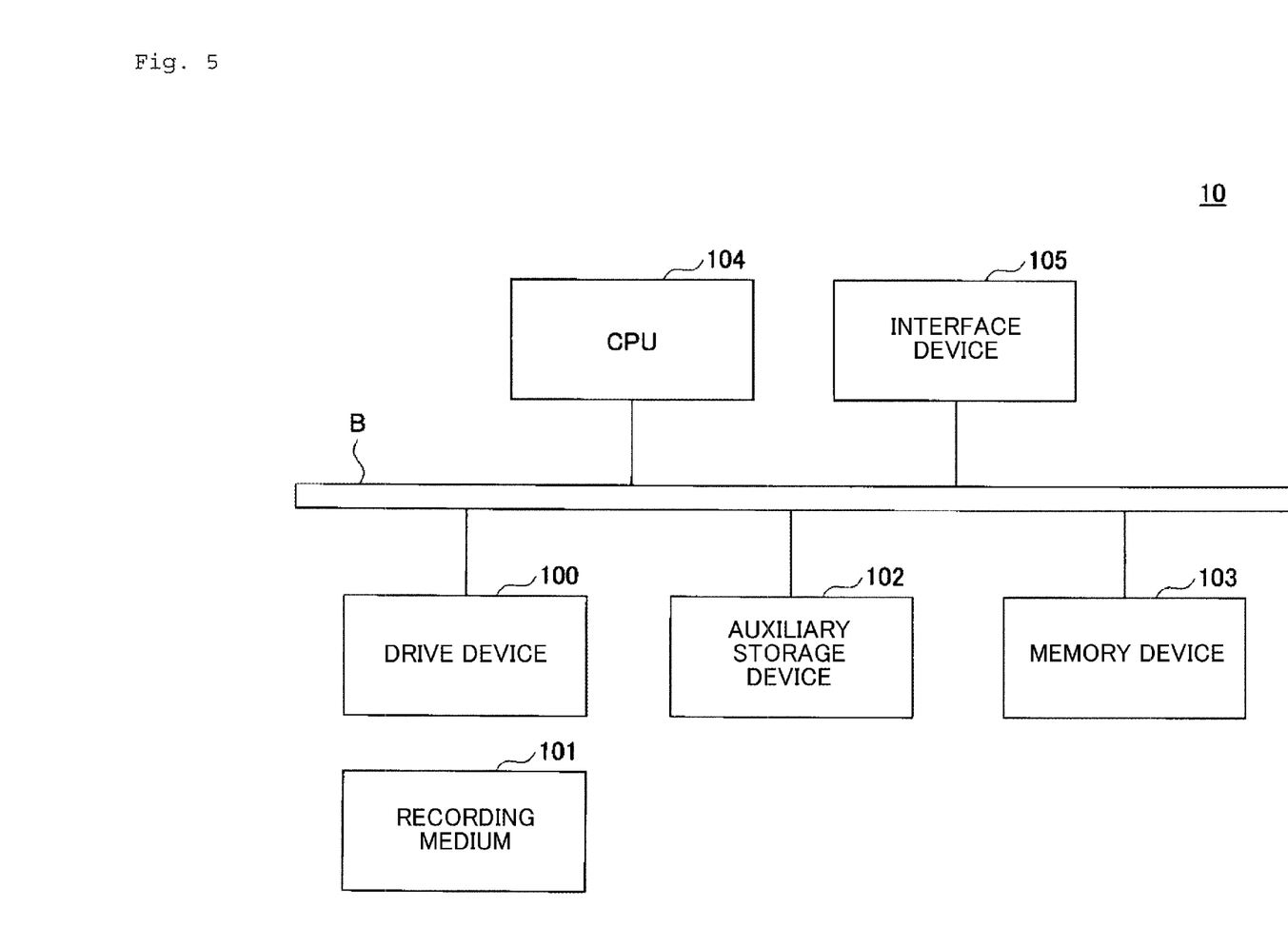
FIG. 5 is a diagram illustrating a hardware configuration example of a translation device 10 according to the first embodiment.

Subsequently, the translation device 10 that implements the model illustrated in FIG. 3 will be described. FIG. 5 is a diagram illustrating a hardware configuration example of the translation device 10 according to the first embodiment. The translation device 10 in FIG. 5 includes a drive device 100, an auxiliary storage device 102, a memory device 103, a CPU 104, an interface device 105, and the like, which are connected to each other by a bus B.

A program that executes processing in the translation device 10 is provided by a recording medium 101 such as a CD-ROM. When the recording medium 101 storing the program is loaded into the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads and stores the program from the auxiliary storage device 102 in response to an instruction to start the program. The CPU 104 implements functions related to the translation device 10 according to the program stored in the memory device 103. The interface device 105 is used as an interface for connecting to a network.

Figure 6:
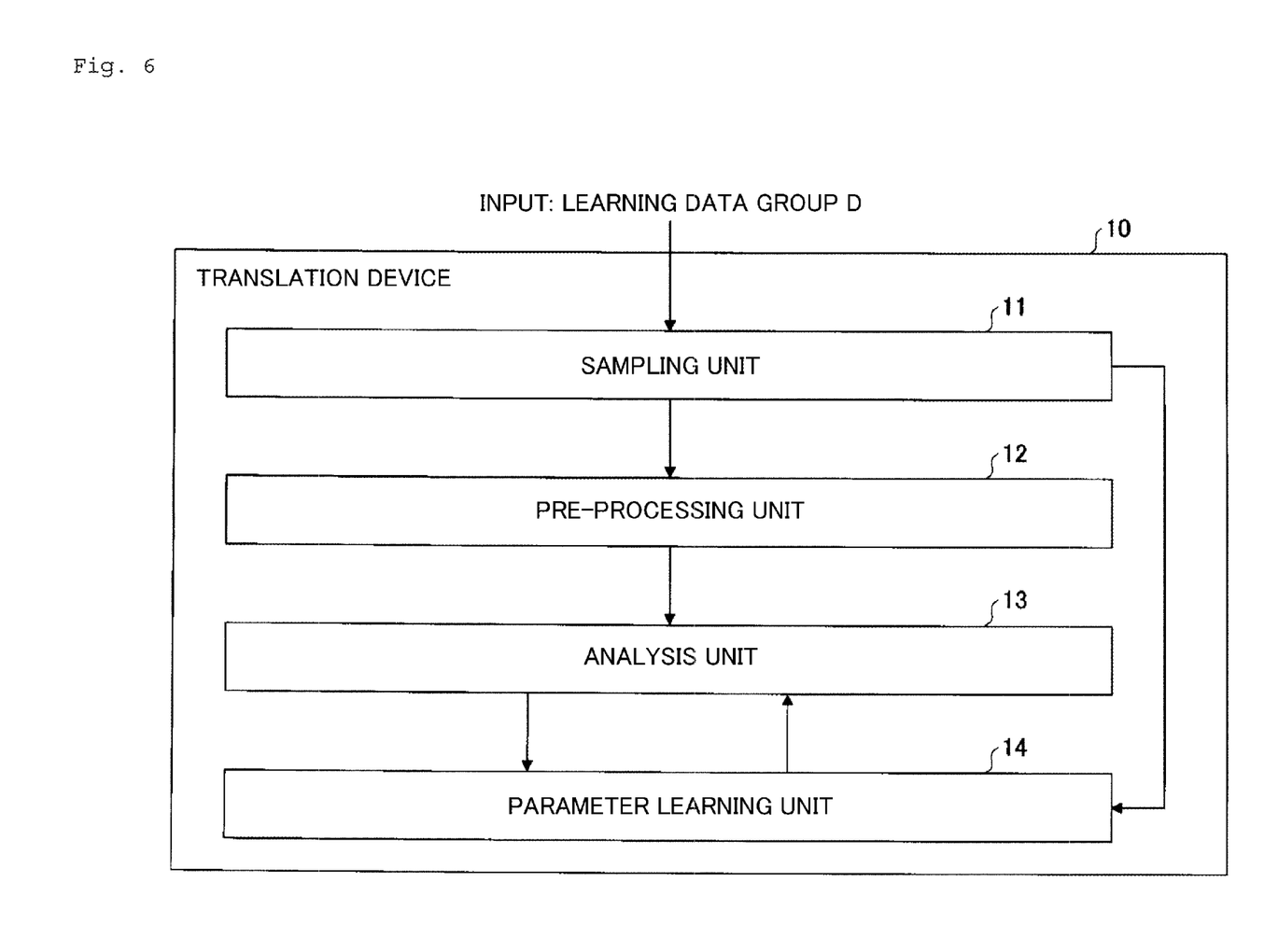
FIG. 6 is a diagram illustrating a functional configuration example for learning in the translation device 10 according to the first embodiment.

FIG. 6 is a diagram illustrating a functional configuration example for learning in the translation device 10 according to the first embodiment. In FIG. 6, the translation device 10 includes a sampling unit 11, a pre-processing unit 12, an analysis unit 13, a parameter learning unit 14, and the like. Each of these units is implemented by processing of causing the CPU 104 to execute one or more programs installed in the translation device 10.

The sampling unit 11 samples (extracts) training data for one set of steps of learning processing from a training data group D. The training data is a set of an input series (input sentence) x and an output series (output sentence) y' corresponding to the x (which is the correct sentence for the X).

The pre-processing unit 12 performs pre-processing on an input sentence such as a written text. In the present embodiment, as the pre-processing, the input sentence is divided into units for processing (words and the like). The pre-processing unit 12 outputs the series of units for processing after division as the input series x. Note that the units for processing may be other than word units. For example, partial word units ("Sennrich, R., Haddow, B., and Birch, A.: Neural Machine Translation of Rare Words with Subword Units, in Proceedings of ACL, PP. 1715-1725 (2016)") may be used as the units for processing.

The analysis unit 13 functions as the encoder, the decoder, and the reconstructor illustrated in FIG. 4.

The parameter learning unit 14 learns the learning model (learning parameter group) of the analysis unit 13 based on Equation (5).

Figure 7:
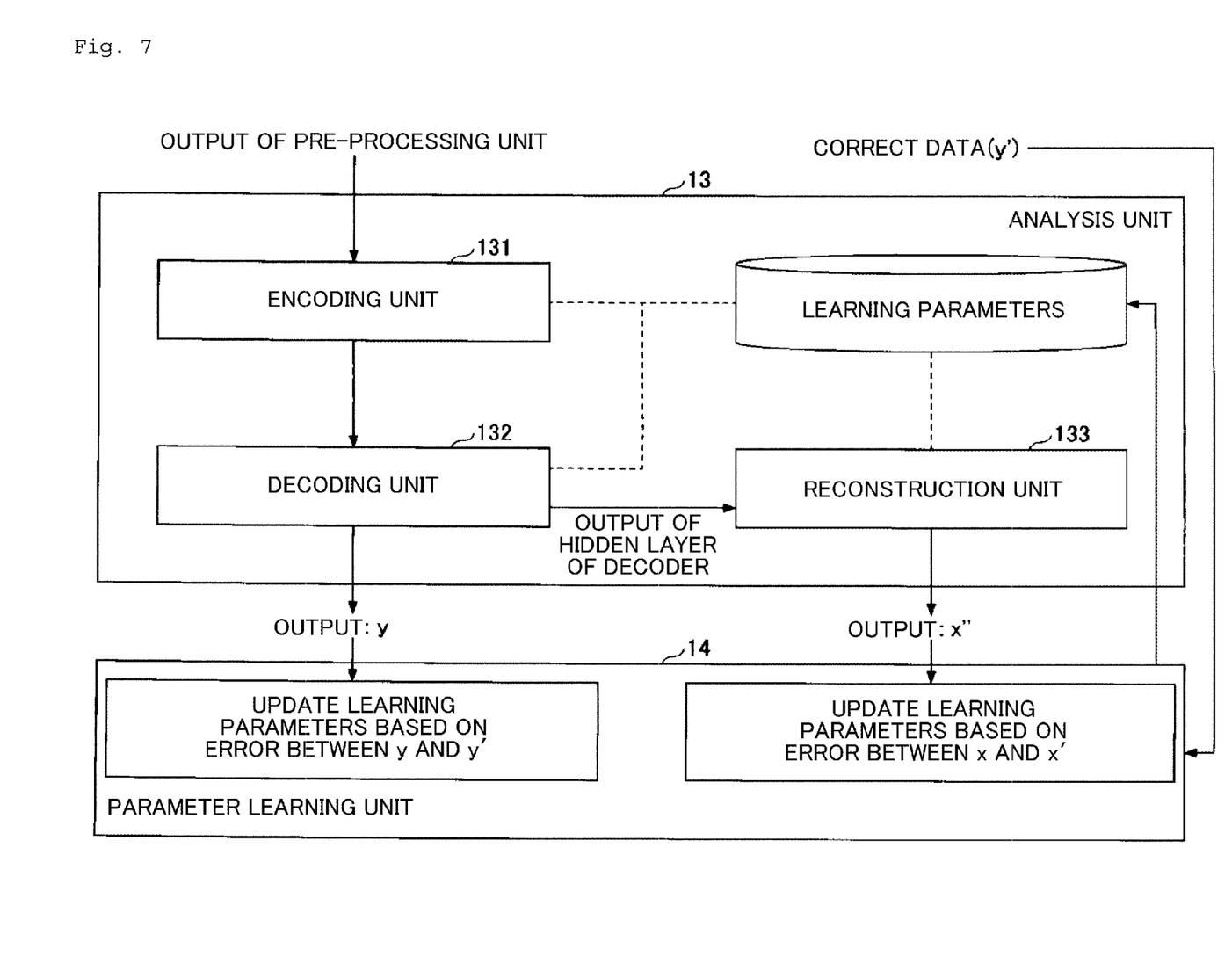
FIG. 7 is a diagram for explaining the detail of an analysis unit 13.

FIG. 7 is a diagram for explaining the detail of the analysis unit 13. As illustrated in FIG. 7, the analysis unit 13 includes an encoding unit 131, a decoding unit 132, a reconstruction unit 133, and the like.

The encoding unit 131 functions as the encoder in FIG. 4. The decoding unit 132 functions as the decoder in FIG. 4. The reconstruction unit 133 functions as the reconstructor in FIG. 4. However, as described in FIG. 3, the substance of the reconstructor is the same as the encoder. Therefore, the substance of the reconstruction unit 133 is the same as the encoding unit 131.

Note that FIG. 7 illustrates updating, by the parameter learning unit 14, the learning parameters of the encoding unit 131 and the decoding unit 132 based on an error between y (output sentence) which is an output from the decoding unit 132 and y' (correct output sentence); and updating, by the parameter learning unit 14, the learning parameters of the encoding unit 131, the decoding unit 132, and the reconstruction unit 133 based on an error between x" which is an output from the reconstruction unit 133 and the input series x. However, the learning parameters of the reconstruction unit 133 are the same as those of the encoding unit 131. Accordingly, by substantially learning the learning parameters of the encoding unit 131 and the decoding unit 132, the learning parameters of the reconstruction unit 133 are also automatically learned.

Figure 8:
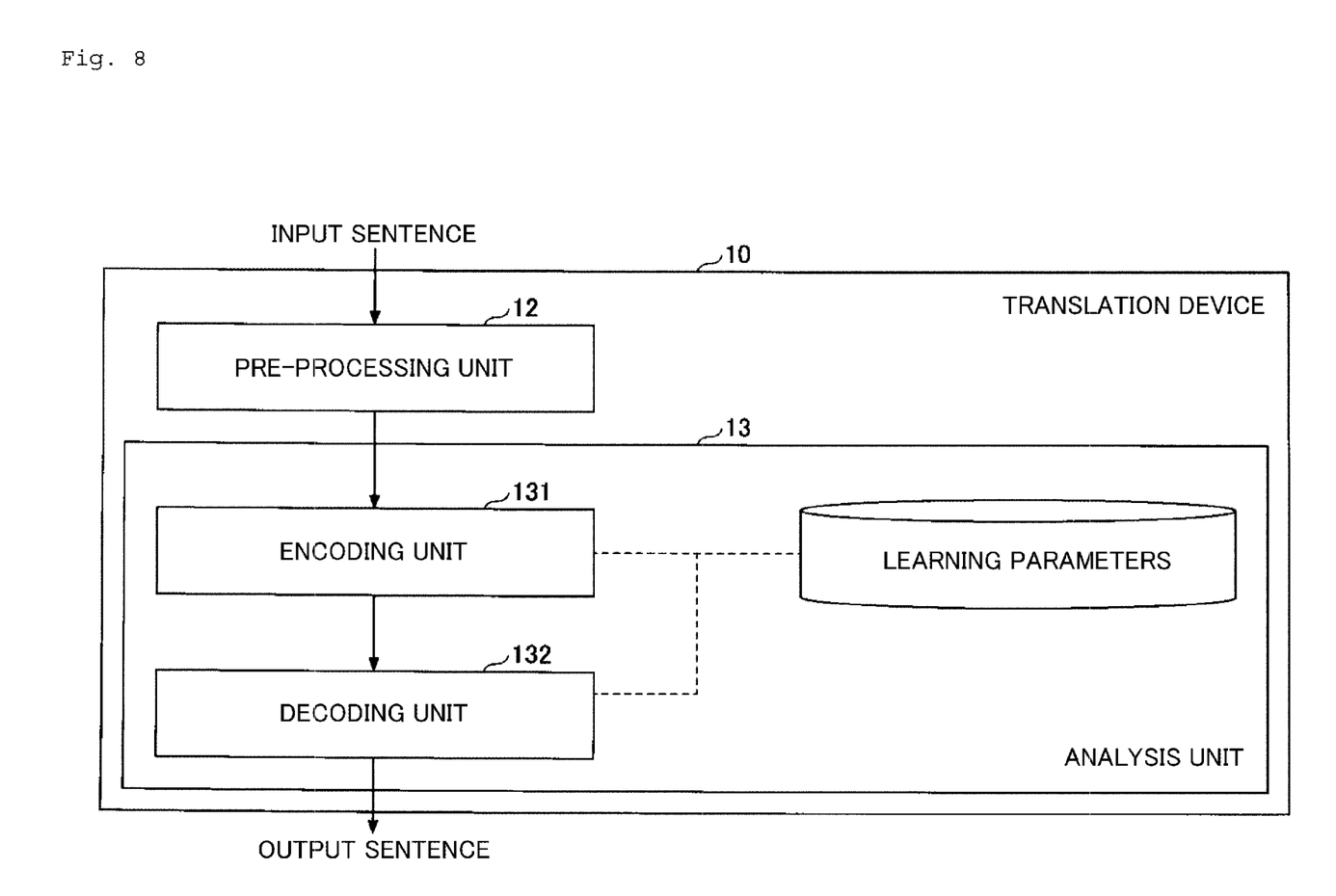
FIG. 8 is a diagram illustrating a functional configuration example for translation in the translation device 10 according to the first embodiment.

FIG. 8 is a diagram illustrating a functional configuration example for translation in the translation device 10 according to the first embodiment. In FIG. 8, the same parts as those in FIG. 6 or FIG. 7 are designated by the same reference numerals, and the description thereof will be omitted. As illustrated in FIG. 8, the translation device 10 does not include the parameter learning unit 14 for translation. Further, the analysis unit 13 does not include the reconstruction unit 133.

Note that the translation device 10 for learning and the translation device 10 for translation may be configured using a different computer.

Figure 9:
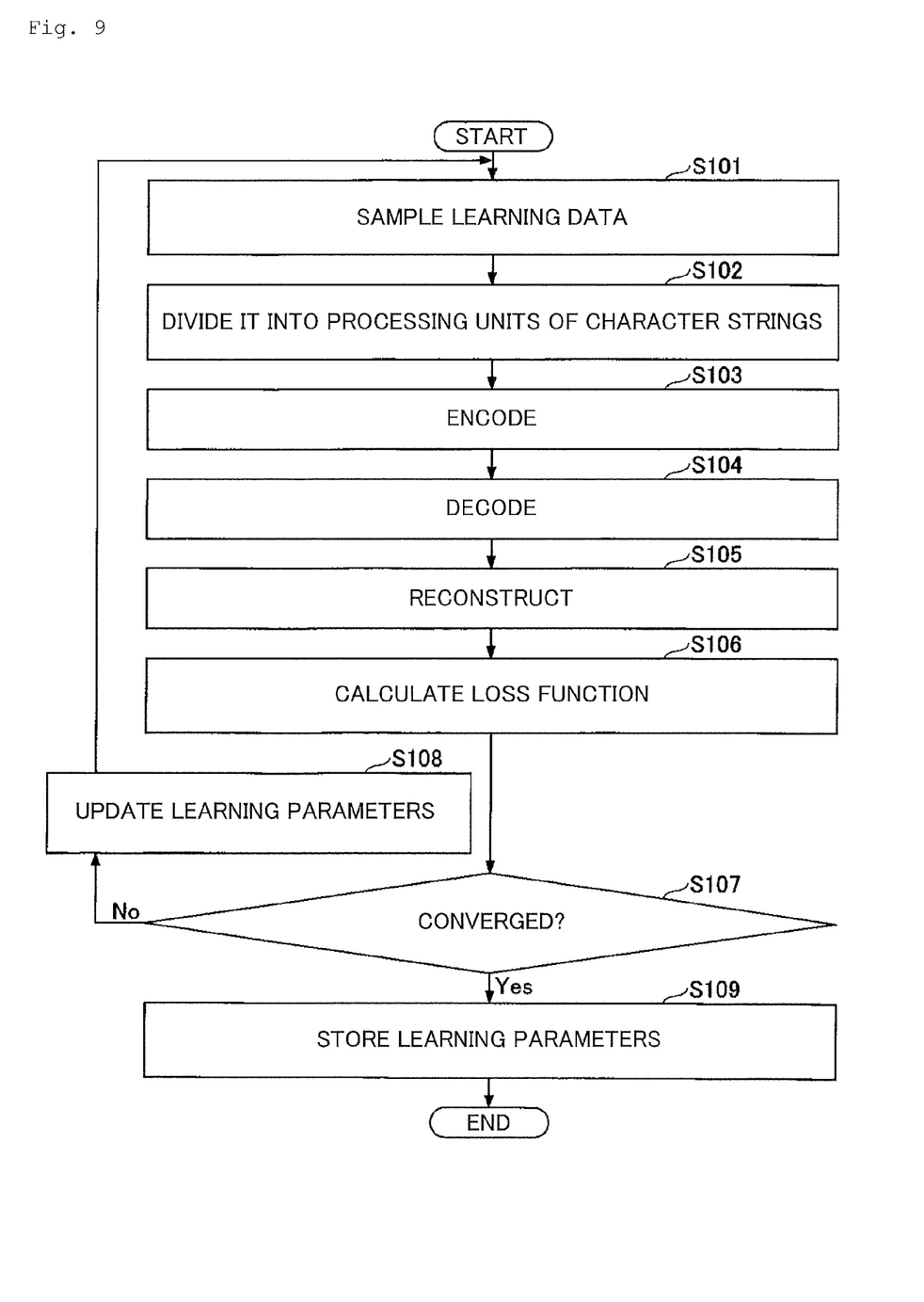
FIG. 9 is a flowchart for explaining an example of a processing procedure of learning processing performed by the translation device 10 according to the first embodiment.

Hereinafter, a processing procedure performed by the translation device 10 will be described. FIG. 9 is a flowchart for explaining an example of the processing procedure of learning processing performed by the translation device 10 according to the first embodiment.

In step S101, the pre-processing unit 12 samples a part of the training data (hereinafter, referred to as the "target training data") from the training data group D prepared in advance. The sampling may be performed using a known method.

Subsequently, the pre-processing unit 12 divides the input sentence of the target training data into units for processing (e.g., units of words) to generate an input series x (S102).

Subsequently, the encoding unit 131 performs encoding calculation with an input of the input series x based on Equation (1) (S103).

Subsequently, the decoding unit 132 performs decoding calculation with an input of the calculation result from the encoding unit 131 (e.g., the calculation result $h^X$ from the feed-forward layer of the encoding unit 131) and the like based on Equation (2) (S104).

Subsequently, the reconstruction unit 133 performs calculation corresponding to the reconstructor with an input of the calculation result $h^Y$ from the feed-forward layer of the decoding unit 132 based on Equation (4) (S105).

Subsequently, the parameter learning unit 14 calculates an error in translation from x to y (error between y' and y) and an error in reconstruction from y to x (error between x and x") based on the loss function represented by Equation (5) (S106).

Subsequently, the parameter learning unit 14 determines whether or not the calculation result of the loss function satisfies a predetermined convergence condition (S107). If the calculation result does not satisfy the convergence condition (No in S107), the parameter learning unit 14 updates the learning parameters of the encoding unit 131 and the decoding unit 132 by a known method based on the calculation result (S108). In this case, step S101 and subsequent steps are repeated based on the updated learning parameters. Note that by updating the learning parameters of the encoding unit 131 and the decoding unit 132, the parameters of the reconstruction unit 133 are also automatically updated.

On the other hand, if the calculation result of the loss function satisfies the predetermined convergence condition (Yes in S107), the parameter learning unit 14 stores the learning parameters of the encoding unit 131 and the decoding unit 132 at this time, for example, in the auxiliary storage device 102 or the like (S109). As a result, the encoding unit 131, the decoding unit 132, and the reconstruction unit 133 (actually, the encoder and the decoder in FIG. 3) form a learned neural network.

Note that when the task after learning is executed (when neural machine translation is executed), the input series x to be translated is input in step S101, and the output sentence y' of the translation result is output in step S104. Step S105 and subsequent steps are not performed.

As described above, according to the first embodiment, the parameters are shared between the encoding unit 131 and the reconstruction unit 133 (the reconstruction unit 133 is configured using the encoding unit 131). Therefore, it is possible to implement a reconstruction learning model while suppressing an increase in parameters.

Next, a second embodiment will be described. In the second embodiment, differences from the first embodiment will be described. The points not particularly mentioned in the second embodiment may be substantially the same as those in the first embodiment.

In recent years, a technique has been proposed for learning various tasks with symmetry (e.g., voice-from/to-text conversion, Japanese-from/to-English translation) by learning a bidirectional model at the same time in order to aim at synergistically improving the performance of models in both directions ("Di He, Yingce Xia, Tao Qin, Liwei Wang, Nenghai Yu, Tie-Yan Liu, and Wei-Ying Ma. Dual learning for machine translation. In Proceedings of NIPS, pp. 820-828, 2016."). This technique is commonly referred to as bidirectional learning (Dual Learning). In particular, machine translation is frequently taken up as a subject of bidirectional learning because the bidirectional model of an original language to a target language and the target language to the original language is highly symmetric.

In normal bidirectional learning, the model parameters themselves are held bidirectionally and independently, and learning is performed using the output of the bidirectional model. Meanwhile, another technique has also been proposed for implementing bidirectional learning by sharing a part of the bidirectional model ("Yingce Xia, Xu Tan, Fei Tian, Tao Qin, Nenghai Yu, and Tie-Yan Liu. Model-level bidirectional learning. In Proceedings of ICML, pp. 5383-5392, 2018."). This technique is referred to as Model-Level Dual Learning. In particular, in NMT, paying attention to the fact that the encoder and the decoder have almost the same structure except for the attention mechanism of the decoder, the Model-Level Dual Learning is implemented by sharing the parameters of the encoder and the decoder for each language. Specifically, $\varphi^C_{Y,1}(\cdot)$ and $\varphi^C_{Y,2}(\cdot)$ in Equation (2) are used for the encoder and $\varphi^C_{X,1}(\cdot)$ and $\varphi^C_{X,2}(\cdot)$ in Equation (1) are used for the decoder to learn translation of y-to-x direction at the same time as represented by the following equation.

[Formula 5]

$$\tilde{y} = \varphi_{Y,1}^C(y), h_t^Y = \varphi_{Y,2}^C(\tilde{y}) \tag{6}$$

$$\tilde{x}_{<t} = \varphi_{X,1}^C(x_{<t}), h_t^X = \varphi_{X,2}^C(\tilde{x}_{<t} + \varphi_X^Z(\tilde{x}_{<t}, h^Y)) \tag{7}$$

For bidirectional learning with the Model-Level Dual Learning, increment of parameters is confined to part related to $\varphi^Z_x(\cdot)$ compared to the model to learn only normal x-to-y, and thereby, an effect of model compression can also be obtained. For learning with the Model-Level Dual Learning, multitask learning is performed based on errors in P(y|x; θ) and P(x|y; θ), and the model parameters are updated.

In the Model-Level Dual Learning, the parameters of the encoder and the decoder are shared, and bidirectional learning is performed as multitask learning with one model, which has effects of improvement in translation accuracy and model compression.

In the second embodiment, multitask learning in the Model-Level Dual Learning is combined with the first embodiment. Specifically, in the Model-Level Dual Learning, paying attention to the fact that the structure of the decoder is similar to the structure of the encoder, these parameters are shared. Furthermore, since the reconstructor and the decoder are similar, these parameters are also shared. As a result, the original sentence reconstruction error due to the reconstructor can be used for learning without increasing the parameters for the new model. In addition, it can be expected that the accuracy of bidirectional learning will be further improved by learning the whole as multitask learning.

By the combination with the multitask learning in the Model-Level Dual Learning, in the second embodiment, learning is performed not only on translation with the model of FIG. 3 but also on the reverse translation with the model of FIG. 3.

Figure 10:
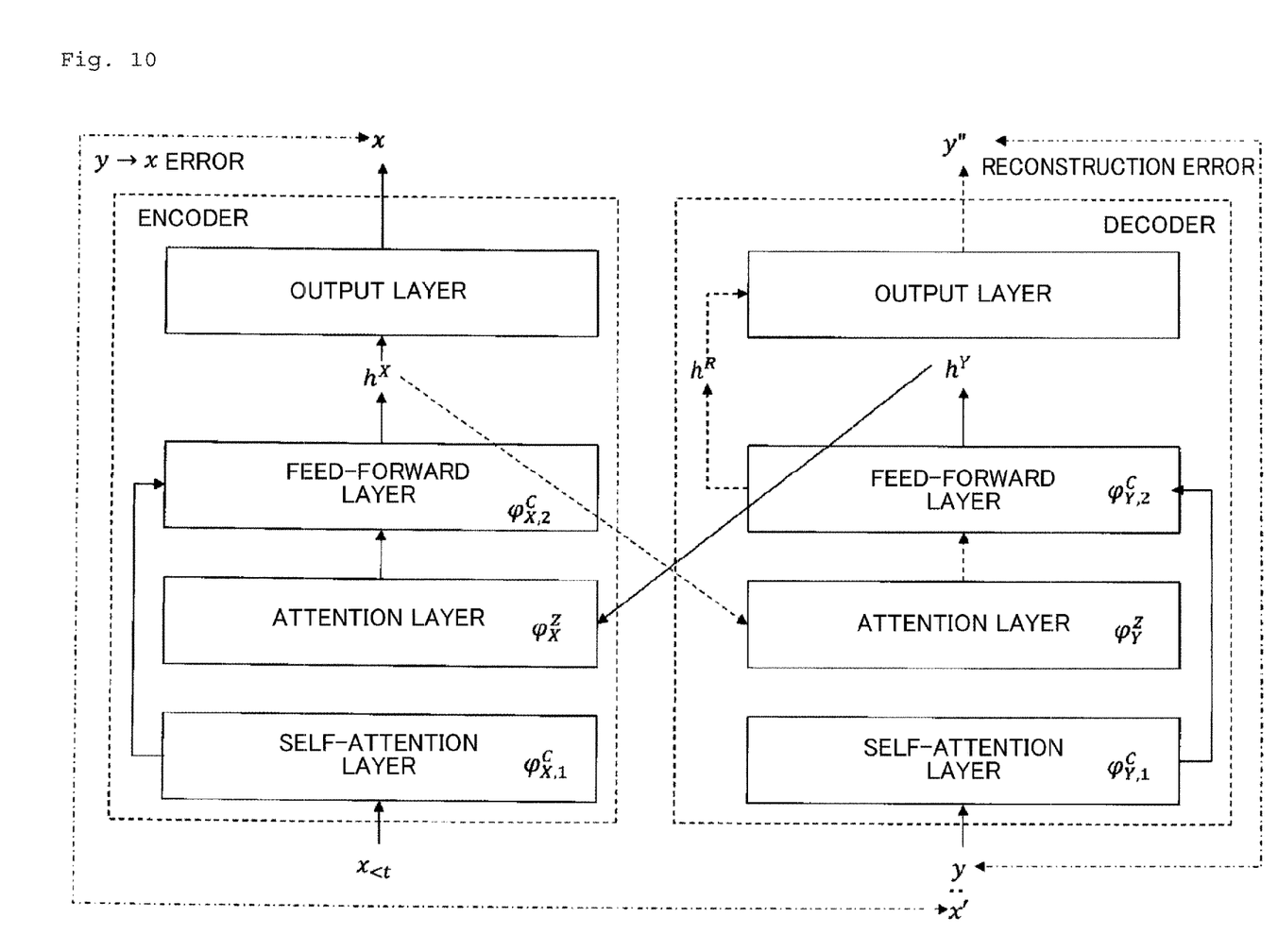
FIG. 10 is a diagram illustrating the outline of a model added in a second embodiment.

FIG. 10 is a diagram illustrating the outline of a model added in the second embodiment. Although FIG. 3 illustrates an example of translation in the x-to-y direction, in the second embodiment, learning is performed at the same time in the backward direction by the same procedure as illustrated in FIG. 10. Specifically, in FIG. 10, y corresponds to an original language sentence and x corresponds to a target language sentence. Accordingly, in FIG. 10, in translation from y to x, a decoder performs encoding and an encoder performs decoding. Therefore, strictly speaking, each of the encoder and the decoder serves as an encoder as well as an decoder. However, the names of the encoder and the decoder remain unchanged in order to maintain consistency with FIG. 3. Further, in FIG. 10, reconstruction learning is performed on the translation from y to x. Note that in FIG. 10, x' represents the correct target language sentence associated with the original language sentence y in training data. Further, y" represents a reconstruction result of the original language sentence from a reconstructor. In FIG. 10, the reconstructor is implemented using the decoder. In other words, the parameters of the decoder and the reconstructor are shared.

Figure 11:
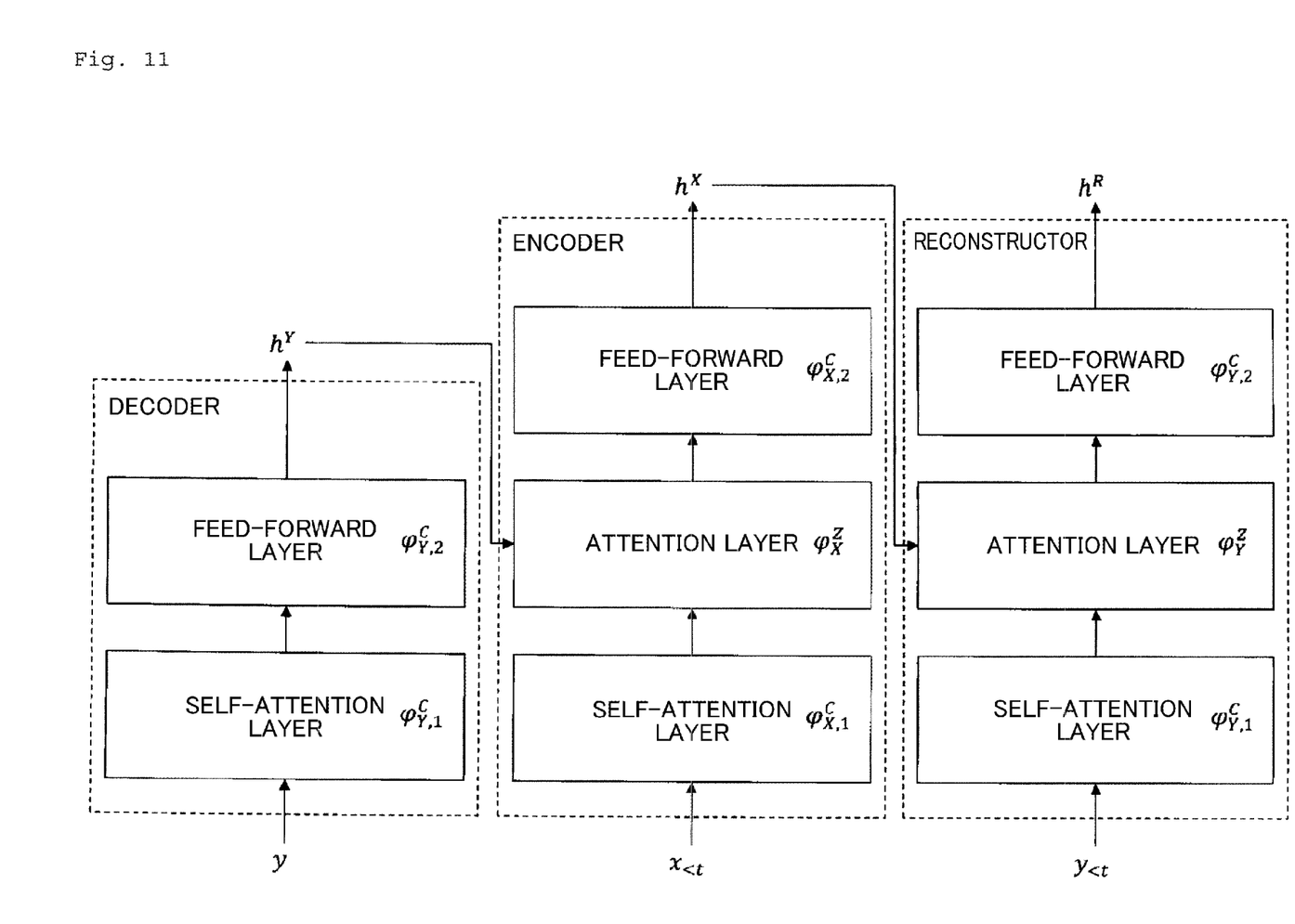
FIG. 11 is a diagram illustrating an example in which a reconstructor is expanded in the model according to the second embodiment.

For the sake of convenience, if expanding the virtually existing reconstructor in FIG. 10, it can be shown as in FIG. 11. FIG. 11 is a diagram illustrating an example in which the reconstructor is expanded in the model according to the second embodiment. In FIG. 11, for the sake of convenience, the output layers of the encoder, the decoder, and the reconstructor are omitted.

As described with reference to FIG. 10, since the substance of the reconstructor is the decoder in the y-to-x direction translation, the parameters for a function (φ) representing each of the layers constituting the reconstructor are the same as those of each layer of the decoder. Note that since the attention layer does not work (is disabled) in encoding, the attention layer in the decoder is omitted in FIG. 11.

In the second embodiment, the reconstructor for the y-to-x direction is formulated by the following Equation (8).

[Formula 6]

$$\tilde{r}_{<t} = \varphi_{Y,1}^C(x_{<t}), h_t^R = \varphi_{Y,2}^C(\tilde{r}_{<t} + \varphi_Y^Z(\tilde{r}_{<t}, h^Y)) \tag{8}$$

In addition, by combining multitask learning, an objective function of the model according to the second embodiment is represented by the following equation.

[Formula 7]

$$\mathcal{L}(\theta) = \underset{\theta}{\mathrm{argmax}} \sum_{n=1}^{N} \{\log P(y^{(n)} \mid x^{(n)}; \theta) + \log P(x^{(n)} \mid h^{Y(n)}; \theta) + \log P(x^{(n)} \mid y^{(n)}; \theta) + \log P(y^{(n)} \mid h^{X(n)}; \theta)\} \quad (9)$$

Here, a bilingual corpus used for learning has N sentences as a whole, and $x^{(n)}$ and $y^{(n)}$ represent the n-th original language sentence and the n-th target language sentence, respectively. Further, $h^{Y(n)}$ and $h^{X(n)}$ represent the hidden layers of the decoder for $x^{(n)}$-to-$y^{(n)}$ translation and $y^{(n)}$-to-$x^{(n)}$ translation, respectively.

FIG. 12 is a flowchart for explaining an example of a processing procedure of learning processing performed by the translation device 10 according to the second embodiment. In FIG. 12, the same steps as those in FIG. 9 or the steps corresponding to those in FIG. 9 are assigned the same step numbers.

In FIG. 12, steps S101 to S105 are performed for each of the x-to-y direction (hereinafter, referred to as "forward direction") and the y-to-x direction (hereinafter, referred to as "backward direction"). Note that a training data group for the forward direction and a training data group for the backward direction may be different or the same. However, if the training data groups for both directions are the same, the input sentence and the output sentence are reversed for the forward direction and the backward direction.

Further, for the backward direction, step S103 is performed by the decoding unit 132, and step S104 is performed by the encoding unit 131.

When steps S101 to S105 are performed for both directions, the parameter learning unit 14 calculates, based on the loss function represented by Equation (9), an error in the translation for the forward direction (error between y' and y), an error in the reconstruction for the forward direction (error between x and x"), an error in the translation for the backward direction (error between x' and x), and an error in the reconstruction for the backward direction (error between y and y") (S106).

The subsequent steps are as described with reference to FIG. 9.

Subsequently, the effectiveness of the second embodiment is verified through an experiment. The experiment is to verify two points: (1) whether the translation accuracy is improved by the second embodiment, and (2) how many of parameters of the model can be reduced as compared with a baseline.

[Experimental Settings]
<Data Set>

In this experiment, English-from/to-German translation and English-from/to-French translation were conducted on the basis of IWSLT shared task data (https://wit3.fbk.eu/) ("Mauro Cettolo, Christian Girardi, and Marcello Federico. WIT3: web inventory of transcribed and translated talks. In Proceedings of EAMT, pp. 261-268, 2012."). The IWSLT2016 learning set was used for NMT learning. In addition, dev2010 was used as a development data set, and data obtained by combining tst2012, tst2013, and tst2014 was used as an evaluation data set. Table 1 shows the number of sentences in each data set.

TABLE 1

|  | DE from/to EN | FR from/to EN |
|---|---|---|
| Train | 189,318 | 208,323 |

TABLE 1-continued

|  | DE from/to EN | FR from/to EN |
|---|---|---|
| Dev | 888 | 890 |
| Test | 3,998 | 3,455 |

Note that in Table 1, Train indicates a training data set, Dev indicates a development data set, and Test indicates an evaluation data set.

Each data set was divided in words by Moses Tokenizer (https://github.com/moses-smt/mosesdecoder/), and sentences with 50 tokens or more were removed for the learning set. After that, the resulting set was divided into subword units using a script (https://github.com/rsennrich/subword-nmt) ("Rico Sennrich, Barry Haddow, and Alexandra Birch. Neural machine translation of rare words with subword units. In Proceedings of ACL, pp. 1715-1725, 2016."). At this time, the number of BPE merges was set to 16,000.

<Model and Hyperparameters>

The baseline and the model according to the second embodiment were implemented as a modification to fairseq (https://github.com/pytorch/fairseq/) ("Jonas Gehring, Michael Auli, David Grangier, Denis Yarats, and Yann Dauphin. Convolutional sequence to sequence learning. In Proceedings of ICML, pp. 1243-1252, 2017."). The encoder and the decoder each had 6 layers, each hidden layer had 512 dimensions, and the hidden layer of the feed-forward layer had 1024 dimensions. The number of heads in the Multi-Head Attention was set to 4, and the dropout probability between layers was set to 0.3. The word-embedded layer and the output layer shared their parameters by Three-way-weight-tying ("Ofir Press and LiorWolf. Using the output embedding to improve language models. In Proceedings of EACL, pp. 157-163, 2017.") (for the bidirectional learning, the same parameters were used in all four layers of the bidirectional word-embedded layer and output layer.) Adam was used as the optimization method, and each mini-batch was set to include approximately 4000 tokens. At first, learning was performed for 150,000 steps without a regenerator, then a reconstructor was added, and as a result, learning was performed for 250,000 steps in total. During learning, the model (parameters) was saved every 1000 steps, and for decoding, the model obtained by averaging the parameters of the 16 models output last was used.

In the decoding, a beam search with a beam width of 4 was performed. At this time, the score for each hypothesis was corrected by the following equation and re-ranked to adjust the sentence length of the output sentence.

[Formula 8]

$$\bar{s}_y = \frac{s_y}{|y|^\alpha} \quad (10)$$

Here, $s_y$ represents a score for each hypothesis, and $|y|$ represents the sentence length of a hypothesis. Further, $\alpha$ is a hyperparameter for controlling the trend of sentence length; for $\alpha<1.0$, the score of a short sentence is highly evaluated, and for α>1.0, the score of a long sentence is highly evaluated. In this experiment, α=0.6.

<Evaluation and Testing>

The translation accuracy is automatically evaluated using BLEU ("[Kishore Papineni, Salim Roukos, Todd Ward, and Wei-Jing Zhu. BLEU: a method for automatic evaluation of machine translation. In Proceedings of ACL, pp. 311-318, 2002.]"). In addition, statistical significance testing was performed by the bootstrap resampling method ("Philipp Koehn. Statistical significance tests for machine translation evaluation. In Proceedings of EMNLP, pp. 388-395, 2004."). For the BLEU score calculation and the statistical significance testing, scripts included with the Moses toolkit were used (https://github.com/moses-smt/mosesdecoder/blob/master/scripts/generic/multi-bleu.perl, https://github.com/moses-smt/mosesdecoder/blob/master/scripts/analysis/bootstrap-hypothesis-difference-significance.pl).

[Experimental Result]

<Translation Accuracy>

Table 2 shows the baseline and the BLEU scores in the second embodiment. In Table 2, "+ reconstructor (proposed method)" corresponds to the second embodiment. Further, * indicates that there is a significant difference at the 5% level, and ** indicates that there is a significant difference at the 1% level, as compared with the case without the reconstructor.

TABLE 2

|  | EN to DE | DE to EN | EN to FR | FR to EN |
|---|---|---|---|---|
| One-directional learning (baseline) | 25.57 | 30.77 | 39.79 | 37.74 |
| +Reconstructor | 28.04** | 33.72** | 41.99** | 40.62** |
| Bidirectional learning | 29.38 | 34.78 | 42.86 | 42.14 |
| +Reconstructor (proposed method) | 29.55 | 34.83 | 43.46** | 42.42* |

According to Table 2, in one-directional learning (baseline), it can be seen that the introduction of the reconstructor significantly improves the BLEU scores at the 1% level for all language pairs. Further, performing the bidirectional learning made it possible to achieve accuracy far exceeding that of the normal one-directional learning. Furthermore, it was found that adding an original sentence reconstruction error based on the reconstructor to the bidirectional learning according to the second embodiment made it possible to achieve the highest translation accuracy in the experimental settings compared in this experiment. In addition, it was found that the second embodiment has statistically significantly higher translation accuracy for "English-to-French" and "French-to-English" as compared with the translation accuracy in the case of the bidirectional learning without the reconstructor.

<Number of Model Parameters>

Table 3 shows the respective numbers of model parameters (the number of model parameters when learning for both directions of English-from/to-German is performed) of the baseline and the second embodiment ("+ reconstructor (proposed method)").

TABLE 3

| | Number of parameters |
|---|---|
| One-directional learning (baseline) | 46.45M * two directions = 92.9M |
| +Reconstructor | 65.35M * two directions = 130.7M |
| Bidirectional learning | 52.7M |
| +Reconstructor (proposed method) | 52.7M |

In the normal NMT, it is necessary to learn a model independently for each translation direction, and the number of model parameters required to perform translation for both directions becomes large. On the other hand, in the bidirectional learning, since the model parameters for both directions are shared and learned as one model, the number of parameters can be reduced as compared with the one-directional learning. Further, in the case where a reconstructor is added to the one-directional learning, it is necessary to newly add parameters for the reconstructor, whereas in the second embodiment, it is not necessary to newly increase the parameters.

Therefore, it was found that the second embodiment can achieve translation accuracy exceeding the baseline while reducing the number of model parameters by 59.7% as compared with the one-directional learning model with the reconstructor.

Note that each of the above embodiments can be applied to a series conversion model (e.g., document summarization, parsing, response sentence generation, etc.) other than neural machine translation.

Note that in each of the above embodiments, the translation device 10 is an example of an information learning apparatus and an information processing apparatus. The encoding unit 131 is an example of a first-series processing unit. The decoding unit 132 is an example of a second-series processing unit and a fourth-series processing unit. The reconstruction unit 133 is an example of a third-series processing unit.

Although the embodiments of the present invention have been described in detail above, the present invention is not limited to such specific embodiments, and various modifications and changes are possible within the scope and spirit of the present invention defined in the claims.

REFERENCE SIGNS LIST

10 Translation device
11 Sampling unit
12 Pre-processing unit
13 Analysis unit
14 Parameter learning unit
100 Drive device
101 Recording medium
102 Auxiliary storage device
103 Memory device
104 CPU
105 Interface device
131 Encoding unit
132 Decoding unit
133 Reconstruction unit
B Bus

The invention claimed is:

1. An information learning apparatus for learning a model of a neural network that generates, from a first series, a second series and reconstructs the first sequence, the information learning apparatus comprising:
a memory and a processor, wherein
the memory stores parameters of the neural network,
the neural network comprises a first model and a second model,
the first model comprises a first self-attention layer, a first attention layer, a first feed-forward layer, and a first output layer,
the neural network performs:
encoding, based on the first self-attention layer and the first feed-forward layer, first data in training data, by further associating the first data of the first series and second data in the second series with each other, and the second data represents correct data of the first data;
decoding, based on the second model, data generated in the encoding to generate third data related to the second series;
reconstructing, based at least on the first self-attention layer, the first feed-forward layer, and the first output layer, the first series for data generated in the decoding as fourth data; and
learning, based on an error between the second data and the third data and an error between the first data and the fourth data, the parameters of the neural network used by the encoding, the decoding, and the reconstructing, and the learning further comprises updating the parameters of the neural network stored in the memory, wherein
the encoding and the reconstructing operations share parameters of the first self-attention layer and the first feed-forward layer of the neural network, as stored in the memory.

2. The information learning apparatus according to claim 1, wherein the neural network further performs:
encoding fifth data in the training data in which the fifth data related to the second series and sixth data which is correct data for the fifth data in the first series are associated with each other, wherein
the reconstructing further comprises decoding data generated in the encoding by the encoding of the fifth data to generate seventh data related to the first series,
the decoding further comprises generating eighth data related to the second series for data generated in the decoding by the generating,
the learning further comprises learning, based on an error between the sixth data and the seventh data and an error between the fifth data and the eighth data, parameters used by the generating, the encoding of the fifth data, and the decoding, and
the decoding and the encoding of the fifth data share at least a part of the parameters of the neural network.

3. An information processing apparatus that generates an output sentence for an input sentence based on the parameters learned by the learning of the information learning apparatus according to claim 1, the
the neural network further performs:
encoding the input sentence based on the parameters of the neural network; and
decoding data generated in the encoding based on the parameters to generate the output sentence.

4. An information learning method performed by a computer including a memory and a processor, the method comprising:
encoding, based on a first self-attention layer of a first model of a neural network and a first feed-forward layer of the first model of the neural network, first data in training data, by further associating the first data of a first series and second data in a second series with each other, and the second data represents correct data of the first data;
decoding, based on a second model of the neural network, data generated in the encoding to generate third data related to the second series;
reconstructing, based at least on the first self-attention layer, the first feed-forward layer, and the first output layer, the first series for data generated in the decoding as fourth data; and
learning, based on an error between the second data and the third data and an error between the first data and the fourth data, parameters of the neural network used by the encoding, the decoding, and the reconstructing, wherein the learning further comprises updating the parameters of the neural network stored in the memory, and
the encoding and the reconstructing operations share parameters of the first self-attention layer and the first feed-forward layer of the neural network, as stored in the memory.

5. An information processing method of generating an output sentence for an input sentence based on the parameters of the neural network learned by the learning of the information learning apparatus according to claim 1, the information processing method performed by a computer including a memory and a processor, the method comprising:
encoding the input sentence based on the parameters of the neural network; and
decoding data generated in the encoding based on the parameters of the neural network to generate the output sentence.

6. A non-transitory computer-readable recording medium having computer-readable instructions stored thereon, which when executed, cause a computer to function as the information learning apparatus according to claim 1.

7. A non-transitory computer-readable recording medium having computer-readable instructions stored thereon, which when executed, cause a computer to function as the information processing apparatus according to claim 3.

8. The information learning apparatus according to claim 1, wherein the second series comprises text.

9. The information learning apparatus according to claim 1, wherein the neural network performs text-to-speech conversion, document summarization, document parsing, and/or response sentence generation to a given query.

* * * * *